United States Patent
Tan et al.

(10) Patent No.: US 7,782,301 B2
(45) Date of Patent: Aug. 24, 2010

(54) SYSTEM AND METHOD FOR VERIFYING DPI VALUES OF COMPUTER MICE

(75) Inventors: Li-Rong Tan, Shenzhen (CN); Xiao-Lin Gan, Shenzhen (CN); Yu-Kuang Ho, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 571 days.

(21) Appl. No.: 11/845,095

(22) Filed: Aug. 27, 2007

(65) Prior Publication Data

US 2008/0129696 A1    Jun. 5, 2008

(30) Foreign Application Priority Data

Dec. 1, 2006    (CN) .................... 2006 1 0157206

(51) Int. Cl.
*G09G 5/00* (2006.01)

(52) U.S. Cl. ...................................... 345/163; 345/157

(58) Field of Classification Search .......... 345/156–181
See application file for complete search history.

(56) References Cited

U.S. PATENT DOCUMENTS

| 7,190,347 | B2 * | 3/2007 | Rensberger | 345/157 |
| 7,542,028 | B2 * | 6/2009 | Suzuki | 345/157 |
| 2003/0201951 | A1 | 10/2003 | Chin | |

* cited by examiner

*Primary Examiner*—Duc Q Dinh
(74) *Attorney, Agent, or Firm*—Clifford O. Chi

(57) ABSTRACT

An exemplary system for verifying DPI values of computer mice is disclosed. The system comprises: a stepper motor connected with a horizontal servo axle and controlling the horizontal servo axle to perform back and forth movements which drives the computer mice to move in a straight line back and forth; a computer configured for receiving measurement parameters, for sending move instructions to the stepper motor, for recording initial coordinates of a computer pointer of the computer mice and current coordinates of the mouse pointers of the computer mice, and calculating DPI values according to the initial coordinates and the current coordinates; and a servo controller electrically connected between the computer and the stepper motor for sending impulse control signals to control operations of the stepper motor. A related method is also disclosed.

10 Claims, 3 Drawing Sheets

SYSTEM AND METHOD FOR VERIFYING DPI VALUES OF COMPUTER MICE

BACKGROUND OF THE INVENTION

1. Field of the Invention

The present invention is generally related to a system and method for verifying DPI (dots per inch) values of computer mice.

2. Description of Related Art

Most computer digitizers are designed to comfortably fit the palm for easy use. Such a device is called a mouse because of its shape and size which can easily be held by a hand. Due to the popular use of portable personal computers, computer mice are also in great demand for mobile computer use.

For users, such as game players, and drafters, a sensitive mouse is often desired. DPI values of the mouse are important in determining sensitivity of the mouse. In order to increase the sensitivity of computer mice, manufacturers take of time on testing DPI value during the phase of verifying. One method for verifying DPI value is as follows: drawing a square with sides of one inch by a computer mouse, putting a mouse pointer of the computer mouse locating at the top left corner of the square, moving the mouse pointer an inch in a straight line back and forth towards another corner of the square, and determining whether the mouse pointer locates at the bottom left corner or the top right corner of the square. However, this method cannot accurately calculate a DPI value because it relies on the user to determine the sensitivity, and thus the results are subjective.

Therefore, what is needed is a system and method for verifying DPI values of computer mice accurately and reliably.

SUMMARY OF THE INVENTION

A system for verifying DPI values of computer mice is provided. The system comprises: a stepper motor connected with a horizontal servo axle and controlling the horizontal servo axle to perform back and forth movements in response to driving the computer mice to move in a straight line back and forth; a computer configured for receiving measurement parameters, for sending move instructions to the stepper motor, for recording initial coordinates of mouse pointers of the computer mice and current coordinates of the mouse pointers of the computer mice, and calculating DPI values according to the initial coordinates and the current coordinates; and a servo controller electrically connected between the computer and the stepper motor for sending impulse control signals to control operations of the stepper motor.

Another embodiment of a method for verifying DPI values of computer mice is provided. The method comprises the steps of: receiving measurement parameters set by a user; sending a move instruction to a servo controller; moving an inch in the straight line back and forth; recording initial coordinates of a mouse pointer of a computer mouse; recording current coordinates of the mouse pointer of the computer mouse; calculating a DPI value according to the initial coordinates and the current coordinates of the mouse pointer; and outputting the calculated DPI value.

Other objects, advantages and novel features of the embodiments will be drawn from the following detailed description together with the attached drawings.

DETAILED DESCRIPTION OF THE INVENTION

Figure 1:
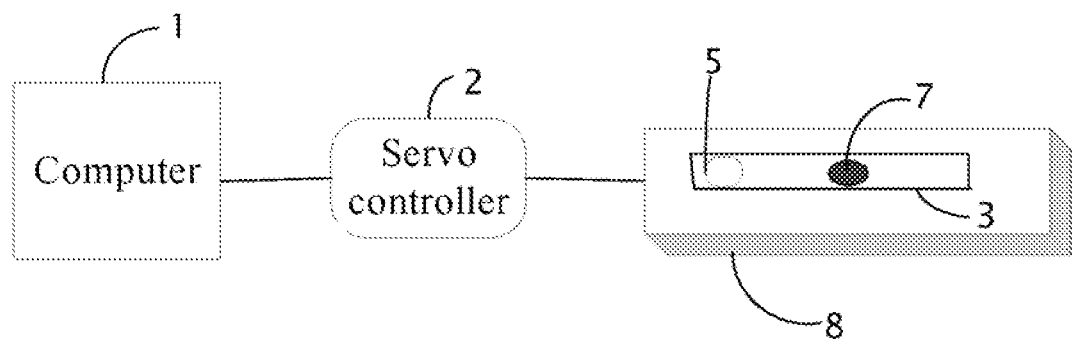
FIG. 1 is a schematic diagram of a hardware configuration of a system for verifying DPI values of computer mice in accordance with a preferred embodiment.

FIG. 1 is a schematic diagram of a hardware configuration of a system for verifying DPI values of computer mice (hereinafter, "the system") in accordance with a preferred embodiment. The system includes a computer 1, a servo controller 2, and a measurement platform 8. A computer mouse 7 is fixed on a horizontal servo axle 3 that is installed on the measurement platform 8. A stepper motor 5 is connected to the horizontal servo axle 3, and controls the horizontal servo axle 3 to perform back and forth movements in response to drive the computer mouse 7 to move in back and forth.

The servo controller 2 is electrically connected to the computer 1 and the stepper motor 5, and configured for sending an impulse control signal to the stepper motor 5 after receiving the control signal from the computer 1. After receiving the impulse control signal from the servo controller 2, the stepper motor 5 drives the horizontal servo axle 3 and the computer mouse 7 moving back and forth.

The computer 1 installs a software application, which is configured for receiving measurement parameters set by a user; for sending move instructions set by the user to the servo controller 2; and for calculating a DPI value of the computer mouse 7.

Figure 2:
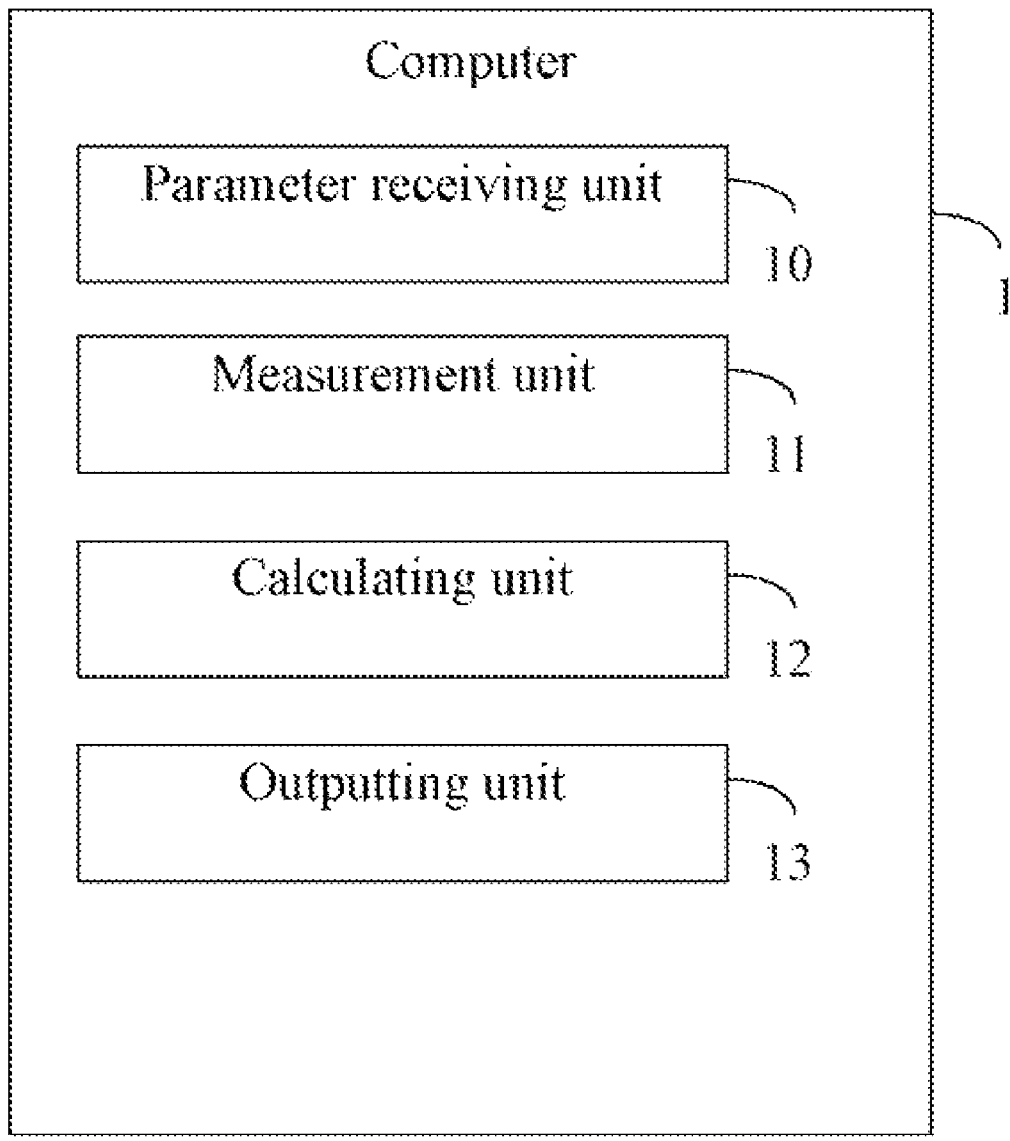
FIG. 2 is a block diagram of main function modules of the computer of the system of FIG. 1.

FIG. 2 is a block diagram of main function modules of the software application of the computer 1. The software application of the computer 1 may include a parameter receiving unit 10, a measurement unit 11, a calculating unit 12 and an outputting unit 13.

The parameter receiving unit 10 is configured for receiving measurement parameters set by the user. The measurement parameters may include measurement times, and a target DPI value.

The measurement unit 11 is configured for sending the move instructions set by the user to the servo controller 2 so as to control the stepper motor 5 to drive the horizontal servo axle 3. Each move instruction may include a move direction, a track and a distance. In the preferred embodiment, the move direction is back and forth back and forth, the track is a straight line, and the distance is an inch. After the stepper motor 5 receives the move instruction from the servo controller 2, the computer mouse 7 moves an inch in a straight line back and forth. The measurement unit 11 is further configured for recording initial coordinates of the mouse pointer of the computer mouse 7 on a display monitor (not shown), and for recording current coordinates of the mouse pointer of the computer mouse 7 after the computer mouse 7 moves an inch in the straight line back and forth.

The calculating unit 12 is configured for calculating a coordinate variable according to the initial coordinates and the current coordinates of the mouse pointer. When the computer mouse 7 moves an inch in the straight line back and forth, the calculated coordinate variable equals the DPI value of the computer mouse 7.

The calculating unit 12 is configured for comparing the calculated DPI value to the target DPI value set by the user to obtain a comparison results. If the calculated DPI value is within an error range, the calculated DPI value of the computer mouse 7 would be regarded as regular. Otherwise, if the calculated DPI value is out of the error range, the calculated DPI value of the computer mouse 7 would be regarded as irregular. The error range can be set according to actual request. The comparison result is either regular or irregular.

The outputting unit 13 is configured for outputting the calculated DPI value and comparison results of whether the calculated DPI value is regular or irregular.

Figure 3:
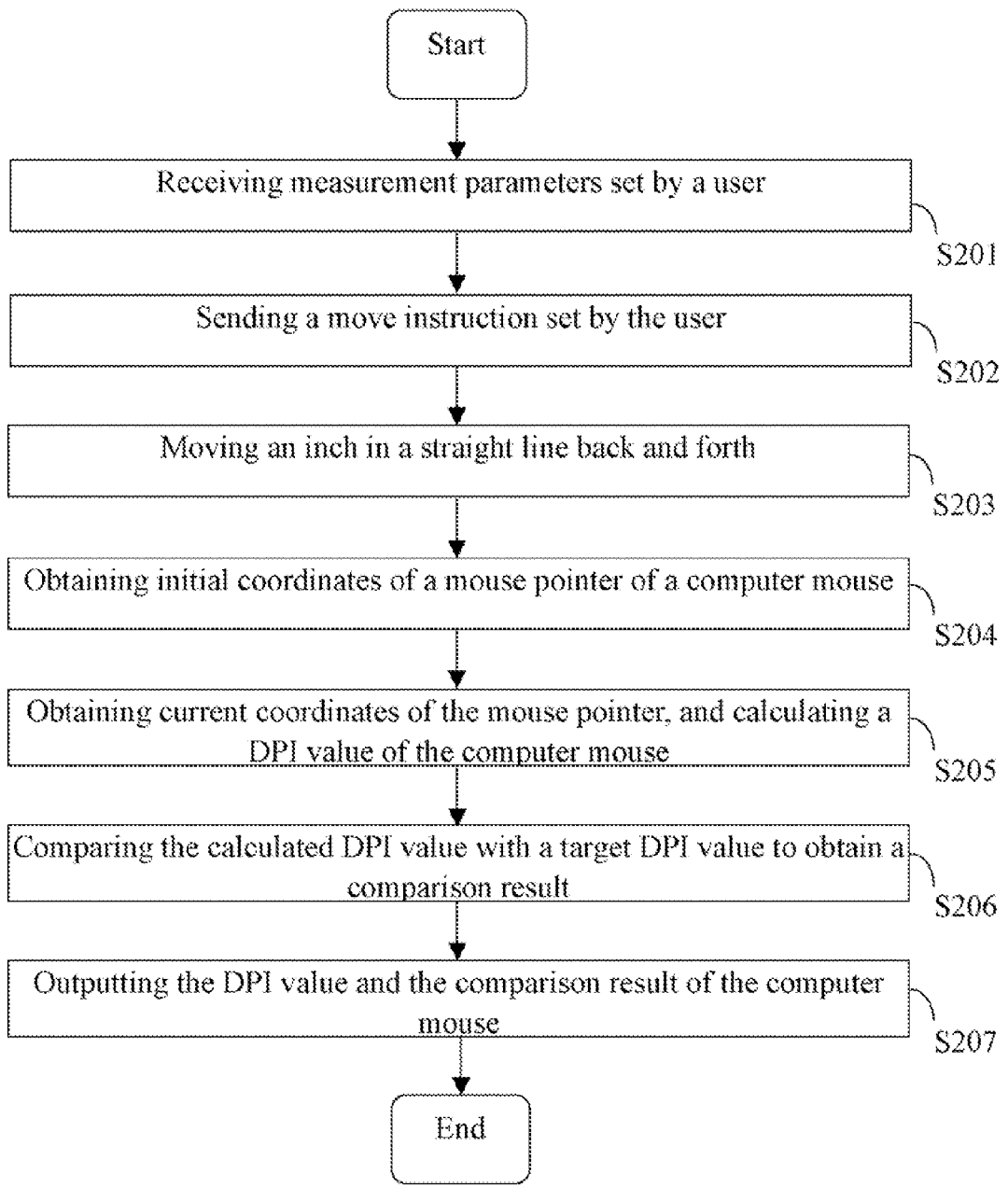
FIG. 3 is a flow chart of a preferred method for verifying DPI values of computer mice by utilizing the system of FIG. 1.

FIG. 3 is a flow chart of a preferred method for verifying DPI values of computer mice. In step S201, the parameter receiving unit 10 receives measurement parameters set by the user. The measurement parameters may include measurement times, and a target DPI value. In step S202, the measurement unit 11 sends a move instruction set by the user to the servo controller 2 in order to control the stepper motor 5 to drive the horizontal servo axle 3. The move instruction may include a move direction, a track and a distance. In the preferred embodiment, the move direction is back and forth back and forth, the track is a straight line, and the distance is an inch. In step S203, after the stepper motor 5 receives a move instruction from the servo controller 2, the computer mouse 7 moves an inch in the straight line back and forth. In step S204, the measurement unit 11 records an initial coordinate of the mouse pointer of the computer mouse 7 before the computer mouse 7 begins to move. In step S205, the measurement unit 11 records current coordinates of the mouse pointer of the computer mouse 7. The calculating unit 12 calculates a coordinate variable (DPI value) according to the initial coordinates and the current coordinates of the mouse pointer. In step S206, the calculating unit 12 compares the calculated DPI value with the target DPI value to obtain a comparison result. The comparison result may be regular and irregular. In step S207, the outputting unit 13 outputs the calculated DPI value and the comparison result of the computer mouse 7.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for verifying DPI values of computer mice, the system comprising:
    a stepper motor connected with a horizontal servo axle and controlling the horizontal servo axle to perform back and forth movements in response to driving the computer mice to move in a straight line back and forth;
    a computer configured for receiving measurement parameters, for sending move instructions to the stepper motor, for recording initial coordinates of mouse pointers of the computer mice and current coordinates of the mouse pointers of the computer mice, and calculating DPI values according to the initial coordinates and the current coordinates; and
    a servo controller electrically connected with the computer and the stepper motor for sending impulse control signals to control operations of the stepper motor.

2. The system according to claim 1, wherein the computer comprises:
    a parameter receiving unit configured for receiving measurement parameters set by a user;
    a measurement unit configured for sending move instructions set by the user to the servo controller to control the stepper motor to drive the horizontal servo axle;
    the measurement unit configured for recording the initial coordinates of mouse pointers of the computer mice, and for recording the current coordinates of the mouse pointers of the computer mice after the computer mice moves an inch in the straight line back and forth;
    a calculating unit configured for calculating DPI values according to the initial coordinates and the current coordinates of the mouse pointers of the computer mice; and
    an outputting unit configured for outputting the calculated DPI values.

3. The system according to claim 2, wherein the measurement parameters include measurement pattern, times, and a target DPI value.

4. The system according to claim 2, wherein each move instruction may include a move direction, a track and a distance.

5. The system according to claim 2, wherein the DPI value equals coordinate variable of the computer mouse.

6. The system according to claim 2, wherein the calculating unit is further configured for comparing the calculated DPI value with the target DPI value set by the user.

7. The system according to claim 2, wherein the horizontal servo axle can be replaced by a vertical servo axle.

8. A computer-based method for verifying DPI values of computer mice, the method comprising the steps of:
    receiving measurement parameters set by a user;
    sending a move instruction to a servo controller;
    moving an inch in a straight line back and forth;
    recording initial coordinates of a mouse pointer of a computer mouse;
    recording current coordinates of the mouse pointer of the computer mouse;
    calculating a DPI value according to the initial coordinates and the current coordinates of the mouse pointer; and
    outputting the calculated DPI value.

9. The method according to claim 8, wherein the measurement parameters include measurement pattern, times, and a target DPI value.

10. The method according to claim 9, further comprising a step of:
    comparing the calculated DPI value with the target DPI value to obtain a comparison result.

* * * * *